April 22, 1969 W. HUFF 3,439,449
APPARATUS AND METHOD FOR CULTURING AND PROPAGATING MARINE ALGAE
Filed Jan. 11. 1967
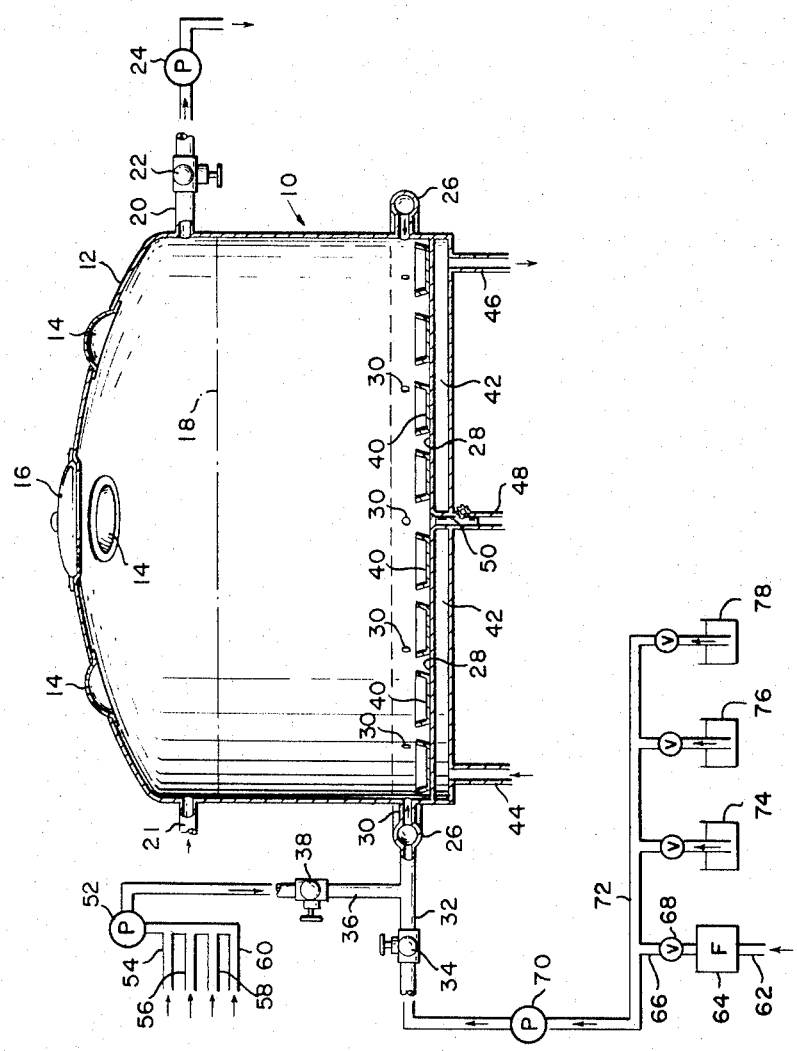
WALTER HUFF
INVENTOR.
BY
Graybeal, Cole & Barnard
ATTORNEYS United States Patent Office 3,439,449
Patented Apr. 22, 1969

3,439,449
APPARATUS AND METHOD FOR CULTURING AND PROPAGATING MARINE ALGAE
Walter Huff, West Vancouver, British Columbia, Canada, assignor, by mesne assignments, to Sea-Chem Industries Ltd., Vancouver, British Columbia, Canada, a corporation of the Province of British Columbia
Filed Jan. 11, 1967, Ser. No. 608,570
Int. Cl. A01g 7/00, 31/00
U.S. Cl. 47—1.4            16 Claims

ABSTRACT OF THE DISCLOSURE

This invention relates to the cultivation of algae, and the harvest of same is carried out through the separation of algae from a culture media by evaporation of the latter.

Method and apparatus involving an isolated vessel containing ocean water which has been filtered of natural enemies of algae and which water is provided with adult algae in the reproductive stage of their life cycle. The water may be taken off without removal of the minute free-swimming organisms. The minute organisms are held in the vessel until attached to trays, catchers, receivers, or other objects and until large enough to be planted in a natural ocean habitat.

This invention relates generally to the art of methods and apparatus for the propagating and culturing of marine algae. More specifically does the invention herein relate to method and apparatus for propagating and culturing marine algae in a controlled natural environment during the critical early stages of an algae life cycle wherein the natural enemies of the free-swimming zoospores and their male and female gametophytes have been removed.

United States Patent No. 2,658,310 is directed to the continuous production and harvesting of unicellular chlorella algae with particular emphasis on the provision for light for photosynthesis. This reference is not concerned with culturing the algae which at some stage are benthonic or attached to a substrate. United States Patent No. 2,732,662 shows a process for the mass culturing and harvesting of chlorella algae. This process employs a thin layer or film of aqueous algal suspension in which a continuous flow of the suspension can be maintained so that the organisms or cells can be continuously removed and harvested. Light exposure is of concern in this reference and the culturing period is concerned with the high growth rate, which takes place during a period of low density of cells. United States Patent No. 1,933,950 is directed to the culturing of shell fish and is not concerned with algae propagation. In this reference the cultured shell fish eggs are removed from exhausted culture water by subjecting them to screening or straining in order to recover the larvae. Thus, the larvae can be transferred to new cultural water or the culture water can be exchanged. United States Patent No. 2,854,792 is concerned with the fine dispersion of film of unicellular algal suspension in a closed, partially closed, or open area with walls whereby the dispersions, films or droplets are exposed to light rays. Finally, Japanese Patent No. 9126/61 is concerned with culturing marine plants by cultivating spores or seeds of sea weed or other sea plants in a water tank, attaching the seeds or spores to threads, then winding or twining the threads around implements such as a rope stretching system and placing the rope or implement in the sea or culturing.

Marine algae, as a broad generalization, may be said to have an alternation of sporophyte and gametophytes generations. Brown and red seaweeds all have a common general type of life cycle wherein the large, macroscopic plant, which is collectible as seaweed, is the adult sporophyte generation that produces motile or mobile zoospores or non-motile aplanospores. This asexual or sporophyte generation alternates with a microscopic gametophyte generation of tiny sexual plants wherein reproduction involves the union of gametes which may be motile or non-motile. These microscopic sexual plants are rarely detectable in nature and have been learned about through laboratory culture studies. It is the propagation and culturing of the zoospores and gametophyte generation with which this invention is generally concerned.

Algae, like other organisms capable of photosynthesis, are able to convert inorganic compounds into organic matter. The present process makes use of the continuous growth of photosynthetic micro-organisms in a flowing stream of aqueous, nutrient-carrying medium. The essential light sensitive reaction of photosynthesis is satisfied by exposure of the algae to the rays of natural or artificial sunlight in diurnal cycles or alternating light and dark periods. All of these photosynthetic marine plants are capable of manufacturing their own food and are completely independent, but are themselves either directly or indirectly the source of food for practically all living things in the sea.

Previous attempts at large scale commercial propagation of algae were directed to the use of containers with open upper surfaces or to the use of sealed vessels using flow-through transparent glass or plastic tubes or to trenches or other open ponds in which the culture was stirred or aerated to provide circulation of nutrients. Such attempts however proved to be ineffective and inefficient in propagating marine algae. The primary cause of failure was due to the microscopic size of the gametophyte generation, which, at the time it begins its life cycle, is a motile or mobile zoospore and alternatively is dependent at some period in its generation cycle upon the union of tiny motile gametes. Prior investigators have found that their commercial propagation of algae became uneconomical because they had no practicable method of changing the sea water and thus supplying fresh food without losing their minute charges. In any successful method of accomplishing this water change, the food values must be retained while the marine bodies which are inimical to the growth of the algae must be eliminated. Because the gametophyte generation of algae usually has a period where the tiny plants are benthonic or fixed to some substrate, this water change must occur within the culture vessel where the plants are attached simultaneously with the prevention of loss of the small zoospores or gametes released by these plants in the overflow water resulting from the addition of replenishing water. Thus, as stated, such prior attempts have been ineffective because they failed to fulfill the foregoing requirements.

In order that the scope of the contributions of this invention may be fully grasped, it seems necessary to give a brief synopsis of the life history in marine algae and thereafter of the novel steps and apparatus of this invention in culturing and propagating such algae. Nereocystis leutkeana can be used to illustrate a typical heteromorphic alternation of dissimilar generations found among marine algae. This particular algae has an astronomical reproductive potential. It is essentially an annual reproductive cycle with the seaweed or sporophyte generation reproducing from June through September. The broad, ribbon-like blades, of which there may be twenty or more per plant, grow at the rate of about two inches per day and may be fourteen feet long by the end of the growing season. Both surfaces of these blades are fertile with about one-third of the surface area of every lamina or blade being fertile. There are about $6 \times 10^6$ sporangia or spore bearing organs per square inch of surface in the fertile regions and each sporangia releases 32 motile zoospores. Hence in one season a single nereocystis kelp plant may produce approximately $4 \times 10^{12}$ zoospores. Each of these mobile reproductive cells is potentially capable of developing into a microscopic filamentatious gametophyte stage. The gametophytes are of both male and female sex. The male plant produces gametes called antherozoides which are freed and lodge against the egg of the female gametophyte. As a result of this gametic union, a new generation of the large nereocystis sporophyte begins. Usually several eggs are produced and fertilized on each female gametophyte. However, even if only one egg per female plant were fertilized, this could result in $2 \times 10^{12}$ new nereocystis algae that could come from one original plant. Many of the red algae are even more prolific than the brown nereocystis used in the above example.

There is an uncommonly high mortality rate of the plants in the motile stage of their life cycle and such plants are undoubtedly important in the diet of many marine organisms. The benthonic or fixed marine algae are not only primary producers of difficult to filter tiny spores but they also contribute to the germination of microscopic gametophyte generations that are in themselves primary producers of microscopic phytoplankton at some stage of their development.

It is therefore among the features of this invention to provide method and apparatus for propagating and culturing marine algae in order to effect a rapid, efficient and economical multiplication of seaweeds whereby useful products such as antibiotics, foods, fats, chlorophyl, proteins and vitamins may be subsequently obtained.

It is another feature of this invention to furnish method and apparatus for the care and treatment of the large, macroscopic or sporophyte generation during the period of the release of free-swimming zoospores and their germination into male and female gametophytes.

It is yet another feature of this invention to supply method and apparatus for fertilization of the microscopic gametophyte generation and their attachment and recovery of the new generation of benthonic or attached sporophytes for seeding in ocean environments.

It is a further feature of this invention to provide method and apparatus for the efficient artificial culturing and propagation of marine algae so that natural enemies of the algae in the critical reproductive state of their development are eliminated.

Culturing or propagating of algae may be regarded as divisible into two primary phases. In the first phase is involved the care and treatment of the large, macroscopic or sporophyte generation in a period of release of free-swimming zoospores and their subsequent germination into male and female gametophytes. The second phase is the period of fertilization of the microscopic gametophyte generation and their attachment and to the recovery from the apparatus of the new generation of benthonic or attached sporophytes for seeding in an ocean environment.

The release of the motile zoospores from the mature sporophyte generation under phase 1 is well understood. A seeding of the apparatus of this invention may best be accomplished by selecting healthy seaweed from its marine environment when it is at the peak of its reproductive cycle and then placing it in the apparatus as a spore source. With reference to both phases of culturing, the object of preparing the water is to eliminate from the natural sea water, containing substances necessary to the life of the algae, such organizisms and matter as would interfere with the culture of the algae. In general, the substances necessary to the life cycle development of algae are either in true solution or are so finely divided as to be smaller than the gametophyte generation and also smaller than the microscopic gametes that cause fertilization of the egg organisms from the female gametophytes. Therefore, and according to circumstances involved, culture water can be prepared by passing natural seawater through suitable screens, filters, or preferably suitable centrifugal machines where the interfering matter and organisms may be retained and thus discarded while the necessary substances are permitted to pass through into the culture apparatus. Development of the gametophyte generation under phase two and growth of the new sporophyte plants in the prepared culture water exhausts the resources of the water and therefore it is necessary to replenish such water periodically or continuously with fresh portions which have received the preliminary filtering treatment described above. The removal of the spent culture water from the apparatus while retaining the microscopic plants within the apparatus is one of the primary features of this invention.

Additional objects, features and advantages of the present invention will appear in the following detailed description taken in conjunction with the accompanying drawings, wherein:

FIGURE 1 is both a schematic and detailed representation showing in section the culture tank and equipment for carrying out the process of the present invention and is in the nature of a flow diagram illustrating the method and apparatus for the propagation and culturing of marine algae.

Referring now to FIGURE 1, it will be seen that a large closed container, vessel, or tank, generally designated by the number 10, is provided to hold the culture water. Tank or container 10 is closed by cover or lid 12. Tank 10 is closed so that the tank may, if desired, be subjected to a vacuum of varying intensity. Cover portion 12 also contains light transparent domes 14 in sufficient number and of such dimensions as will admit light since the algae undergo photosynthesis in growth, or otherwise stated their growth in a nutrient containing medium requires absorption of light energy. The light transmitting domes 14 are of clear glass, plastic or like transparent or light transmitting material. Container 10 need not be of any specific size or shape so long as it can be closed and sealed. Cover 12 will be provided with an access door 16 which can be locked or closed so as to seal off the inside of tank 12 from the atmosphere. The container or vessel 10 is large enough so that water line 18 can be varied at depths of up to about thirty feet. Located above the water line 18 is an outlet conduit 20 having valve 22 through which a vacuum of varying intensity can be drawn on container 10 through vacuum pump 24. Container 10 has a dry air inlet conduit 21 through which dry air of no more than about 20% moisture content is admitted.

An ocean water supply system in the form of a ring pipe 26 extends around container 10 in spaced relation to the outside wall and is spaced slightly above the floor or bottom 28 of said tank. Ring pipe 26 is connected to the tank by virtue of a number of short and radially dispersed pipes 30 which are generally equally spaced from each other as shown in FIGURE 1. Ocean water supply ring 26 is connected through a line 32 and a valve 34 to an ocean water supply system. In addition a line 36 with a valve 38 is connected to the ocean water input or supply line 32 to provide an entrance for air or nutrient-enriched gases such as $CO_2$, air, nitrogen and $NH_3$. The bottom or floor 28 of tank 10 accommodates a plurality of catchers, receivers or trays 40 which may be of various shapes and sizes but having the purpose of providing maximum surface areas so as to function as artificial collectors of the cultured gametophytes and sporophytes. The trays may be made of ceramic, clay or other materials. A floor chamber or hollow bottom 32, having inlet pipe 44 and outlet 46 allows cooling or heating fluids to be circulated as desired to regulate the temperature of the culturing water within tank 10.

A drain pipe 48 located at a convenient location in the tank has valve 50 which can be of any conventional structure. A pump 52 is located in line 36 in order to introduce nutrient enriched gases from lines 54, 56, 58, and 60 into the ocean water supply line 32. Ocean water is brought into the system from line 62 through filter 64 and line 66 having valve 68 by way of pump 70. Filter 64, as mentioned above, may be of the type that employs screens or filters, but preferably is a centrifugal filter which catches harmful and predatory organisms that would feed on the cultures within tank 10. In addition, pump 70 is connected by line 72 to nutrient chemical tanks or sources 74, 76 and 78, such as potash, magnesium, ferric ions, $SO_4$, $PO_4$, and potassium.

The method and operation of the culturing system shown in FIGURE 1 will now be described. Container 4 is filled up to but not above vacuum outlet line 20 and dry air inlet 21 with filtered ocean water brought into the system from line 62 through filter 64 and thence through line 72 and pump 70 into line 32 and ring pipe 26. The filtered ocean water is preferably taken from an ocean environment within an existing seaweed bed. The water level should be between 15 and 30 feet from the bottom of container 10. The flow of cooling or heating fluids through pipes 44 and 46 is regulated to maintain the temperature of the ocean water medium within a range optimum for the growth of the particular algae being produced. When tank 10 is filled to the desired level, valve 34 is then closed and healthy specimens of the selected algae, at the peak of their reproductive sporophyte cycle, are placed in the ocean water medium through hatch or cover 16. Access cover or hatch 16 is then closed. Dry air of low moisture content, maximum about 20%, is introduced through line 21 over the surface and external vacuum pump 24 draws evaporated water vapor through conduit 20 from the surface of the water. The source of light, which may be natural or artificial sunlight, is supplied through transparent domes 14. Light rays from the domes penetrate into the top area of the tank 10 and are supplied in diurnal cycles or alternations of light and dark periods corresponding to natural daylight hours. Thus, optimum growth conditions are simulated for the selected algae. After the sporophyte algae has completed its reproductive function, it is removed from the tank.

As growth of the culture in the tank proceeds, air and nutrient gases, such as $CO_2$, nitrogen and $NH_3$ are periodically introduced from lines 54 through 60 through pump 52 and line 36 where they are entrained in the ocean water causing aeration thereof as they enter through ring pipe 26 and radial seed pipes 30. Temperature of the algae culture is maintained at the same daily temperatures as the ocean in the proximity of the seaweed bed from which the donor sporophyte was taken. As water vapor is extracted from the container water level 18 will drop. This loss of water through evaporation is replenished with fresh water containing nutrient chemicals in such proportion that they will maintain the ocean water medium at the same salinity levels and other mineral content levels prevalent in the ocean area where similar gametophyte generations of the selected algae are propagating. Such nutrient chemicals are supplied from tanks 74, 76 and 78 where such chemicals are held in aqueous solution. Ocean water is not taken in through supply line 62 during this cycle due to the fact that its addition to the original ocean water medium would result in the build up of undesirable concentrations of certain elements which are neither consumed by the algae nor evaporated through evacuation line 20. Thus, fresh water may be used as replenishing water. After the sporophyte generation has become established it is possible to resume feeding the apparatus with filtered ocean water through intake or supply line 62 via filter or centrifuge 64 and pump 70. Excess ocean water medium can then be removed to drain 48. Such flow of natural ocean water serves to condition the new sporophyte culture to ocean conditions preparatory to their being removed on trays 40 and seeded in an appropriate marine environment. Seeding of the new sporophyte generations can perhaps be accomplished most readily by breaking up trays or collectors which are made of ceramic and distributing the pieces in the ocean habitat. When the asexual sporophyte generation of the selected algae is becoming benthonic or fixed, the artificial collectors or trays 40 can be immersed for controlled periods of time thereby regulating the density of the culture seeding. That is, the number of gamethophytes that germinate per square inch of collector surface can be controlled. Seeded collectors, after the algae has attached to the trays, can be removed to unseeded duplicate culturing tanks and systems to complete their life cycle as described above. In this way it is possible to use a variety of artificial surfaces in the culturing tanks which would not be practicable under conditions existent in natural seaweed beds. Under this method of culturing it would be possible to considerably increase the crops of commercially valuable algae either by stocking existing beds with artificially propagated sporophytes or by seeding new areas with artificially developed young algae that will in time establish their own seaweed beds.

While the invention has been shown and described with reference to a preferred embodiment thereof, it will be understood by those skilled in the art that various changes may be made and equivalents resorted to therein without departing from the spirit and scope of the invention.

What is claimed is:
1. In the method of artificially culturing marine algae, the steps of
   (a) introducing algae sporophyte generation into a confined and isolated apparatus containing culture water,
   (b) removing spent culture water by dry air feed vacuum evaporation from the surface of said culture water so that the culturing organisms may be retained in the apparatus,
   (c) supplying to the culture water depleted nutrients consumed by the culturing organisms,
   (d) allowing the culturing organisms to remain in the isolated environment through the gametophyte generation until a new sporophyte generation has been established on and attached to artificial collectors in said apparatus.

2. The method according to claim 1 and in which bodies inimical to the development of the culturing organisms have been removed from said culture water.

3. The method according to claim 1 and in which depleted nutrients are supplied to said culture water in make-up water being added to said apparatus.

4. In the method of artificially culturing marine algae in a vessel containing culture water, the steps of:
   (a) introducing artificial collector surfaces into the culture water when the sporophyte or gametophyte generations are becoming benthonic,
   (b) immersing said artificial collectors for predetermined and controlled periods of time to regulate the density of the culture seeded on said collectors,
   (c) transferring some of said seeded artificial collectors to other vessels containing culture water, and
   (d) removing excess and exhausted culture water from said vessels by evaporation.

5. The method according to claim 4 and in which the culture water in all culturing vessels has been filtered to remove bodies inimical to the development of the culture organisms.

6. The method according to claim 4 and in which depleted nutrients consumed by the culture organisms are supplied in make-up water.

7. The method according to claim 4 and in which said culture water is maintained in a covered vessel through which light is selectively and controllably supplied to said culture water.

8. In the method of artificially culturing marine algae in a vessel containing culture water, the steps of:

(a) removing exhausted and depleted culture water from said vessel by evaporation so as not to lose culturing organisms and also adding make-up water to said vessel together with nutrients which have been depleted,
(b) providing artificial collector surfaces in the culture water so that sporophyte or gametophyte generations attach thereto when becoming benthonic,
(c) maintaining said artificial collector surfaces in said culture water until the new sporophyte generation is established on said collectors and thereafter removing said collectors and dividing them into a plurality of parts and seeding said parts in an appropriate marine environment.

9. The method according to claim 8 and in which removal of exhausted culture water is accomplished by dry air feed-vacuum evaporation.

10. The method according to claim 8 and in which the culture water and make-up water are substantially freed of the natural enemies of said culturing organisms.

11. The method according to claim 8 and in which after the culturing organisms have become attached to collectors and before they are seeded into a marine environment fresh water filtered of natural enemies is circulated through said vessel to acclimatize the new algae.

12. The method according to claim 8 and in which said culture water is in a closed vessel and into which vessel light is selectively and controllably introduced preferably in diurnal cycles corresponding to natural daylight hours.

13. Apparatus for artificially culturing marine algae, comprising:
(a) a culturing tank for holding culture water, said tank being substantially closed by a cover portion which is provided with light transmitting means and with access door means,
(b) culturing water inlet means for said tank and also means for introducing nutrient chemicals and gases into said tank, and
(c) means located above the culture water surface for evaporating and removing exhausted culture water from said tank.

14. The apparatus according to claim 13 and in which said inlet means is provided with filtering means for removing from said culture water bodies inimical to said marine algae culturing organisms.

15. The apparatus according to claim 13 and in which said means for evaporating consists of a dry air inlet opening.

16. The apparatus according to claim 13 and in which said means for removing evaporated culture water consists of an outlet opening connected to a vacuum producing means.

References Cited
UNITED STATES PATENTS 3,195,271   7/1965   Golueke et al. _____ 47—1.4

ROBERT E. BAGWILL, *Primary Examiner.*

U.S. Cl. X.R.

195—144